UNITED STATES PATENT OFFICE.

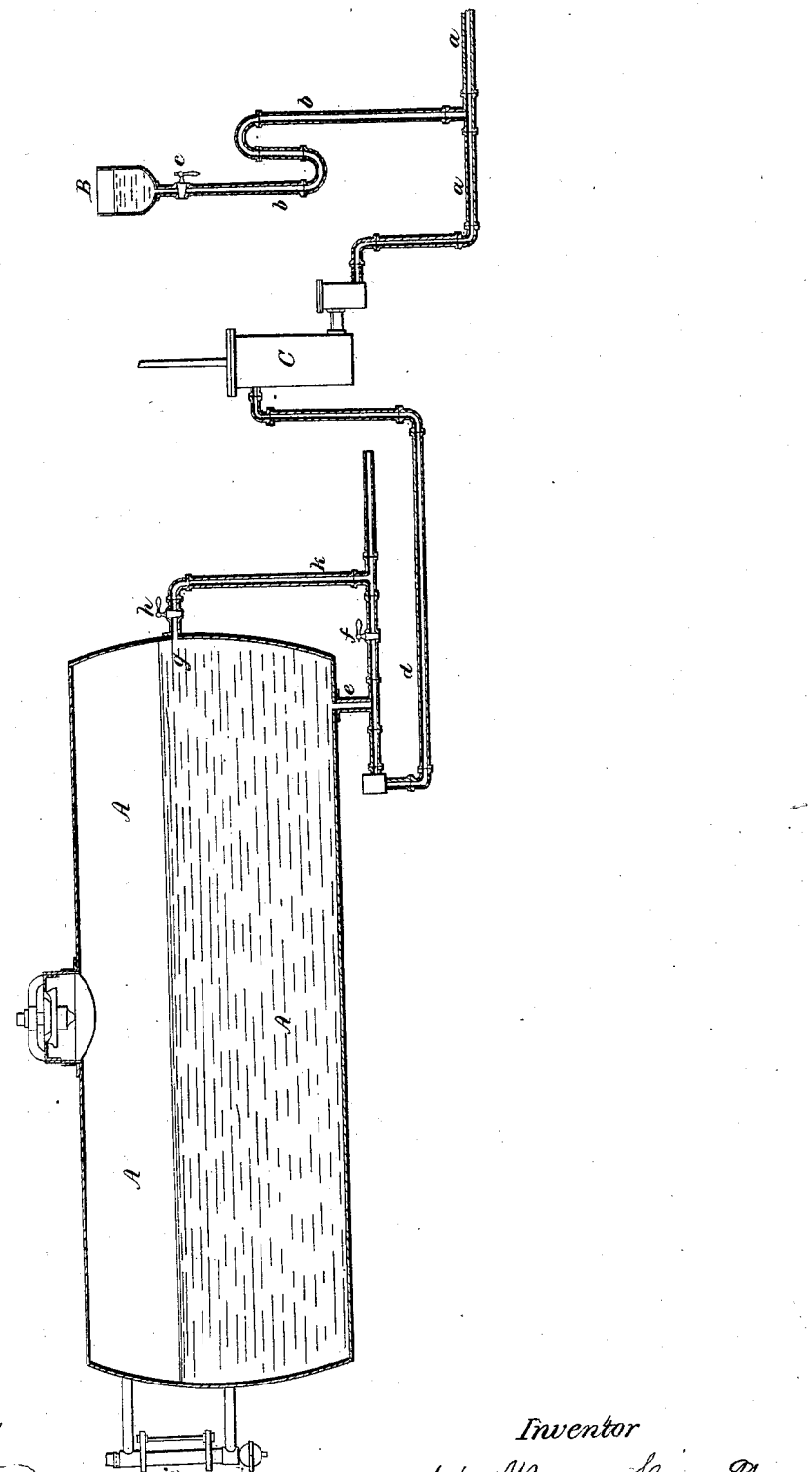

JOHN WARREN HARNETT, OF CINCINNATI, OHIO.

IMPROVEMENT IN PREVENTING INCRUSTATION OF STEAM-BOILERS.

Specification forming part of Letters Patent No. 22,249, dated December 7, 1858.

*To all whom it may concern:*

Be it known that I, JOHN WARREN HAR-NETT, of Cincinnati, in the county of Hamilton and State of Ohio, have invented a new and useful Method of Preventing Incrustation of Steam-Boilers; and I hereby declare the following to be a full, clear, and exact description of the same.

Oleaginous matter in a solid form—such as tallow in lumps—has frequently been introduced into steam-boilers for the purpose of preventing the boiler from "priming," and the same may have been used also for preventing in a measure incrustation of the boiler; but it is well known that the irregular or injudicious use of tallow—for instance, in steam-boilers—not unfrequently creates incrustation by its forming a saponaceous deposit on the sides of the boiler, serving to attach thereto lime or carbonate and other substances contained in the water. Besides, supplying a close steam-boiler with fatty substances in lumps can only conveniently be done at stated intervals when the steam is "down" or previously to "filling" the boiler. Then the tallow or fat may be thrown in through the man-hole in the boiler by removing the lid of the man-hole. When the boiler is under pressure it would be difficult, if not impossible, to feed in the solid fat. To let steam down for the purpose would, as a regular thing, at least, be wasteful of time and seldom practicable without stopping work at a great expense, and the ordinary method of preventing incrustation by blowing and scraping out the boiler at the regular intervals of stopping work might as well, if not better, be continued in preference, as the loss of time attendant upon the one method is almost as great as that necessary to the other, for to remove the lime and other substances held floating by the tallow the boiler, according to all provisions heretofore devised or modes of operation practiced, has to be "blown out" from the bottom, just the same as where scraping or cutting away the incrusted matter is resorted to, and a great disadvantage accrues from the use of fatty matter in lumps for the purpose mentioned, as a larger quantity than necessary at any one time or than necessary for a short period has to be inserted to last till the boiler can be blown out at regular and distant intervals, and so much fat melting and holding the lime and other foreign substances having affinity for the fat, or the fat remaining so long in the boiler as to become densely impregnated with said foreign matter, or, rather, till attracting a large quantity of said matter, a thick coating is formed on the surface of the water in the boiler which materially retards evaporation.

My method of preventing incrustation in steam-boilers is based on a totally different or opposite theory and practice. Thus I specially avoid the use of solid fatty matters. I dispense mainly or altogether with letting the boiler cool or steam go down in order to supply the material for preventing incrustation or to effect removal of deposits, and I effectually or more perfectly prevent incrustation without materially, if at all, retarding evaporation.

The nature of my invention consists in introducing into the steam-boiler, substantially in the manner hereinafter described, oleaginous matter in a fluid state, and for this purpose I use any suitable oil; and my invention further consists in a novel method of using the oil in the boiler to prevent its forming a dense coating, retarding the evaporation, and to facilitate removal of deposit from the boiler at any and frequent intervals without arresting work or stopping the continuous generation of steam. The boiler being in the first instance thoroughly cleansed, and, say, half a gallon of sweet or other suitable oil thrown into it, I then commence or continue at intervals my novel process of preventing incrustation.

Referring to the accompanying drawing, by way of explaining how said process may be carried into effect, but not confining myself to any particular arrangement of means, as they may be almost infinitely varied, I cause the boiler A to be supplied daily, say, with from half a pint to a pint of oil, according to the dimensions of the boiler, essentially as follows.

Connected with the water-supply pipe $a$ to the force-pump that feeds the boiler is an oil-supply pipe, $b$, mounted by a cup, B, to receive the oil; said oil-supply pipe having a cock,

*c*, for regulating the feed of oil and shutting off connection with the water-pipe when oil is not being fed. When it is desired to supply oil to the boiler, the cock *c*, after having been opened to permit the oil to enter the supply-pipe, may be closed, when the action of the force-pump C will draw the oil, along with the water, into it and eject the oil and water together into the boiler. Thus is the most perfect connection established between the oil and water for the former to take up lime and other substances having an affinity for it and rise with them to the surface of the water in the boiler, there to continue its absorbing influence of lime held in solution and hold the same in a floating condition on the top of the water, while the oxide of iron and other substances not having so strong an affinity for the oil, or being too dense to float at the top, will be collected by the oil and precipitated to the bottom of the boiler, but prevented from adhering by reason of their being charged with oil.

The oil and water may enter the boiler at its bottom through an ordinary feed-pipe arrangement furnished with a valve and establishing connection between the force-pump and boiler. This connecting-pipe *d* may be extended or have a branch pipe, *e*, furnished with a blow-off cock, *f*, which on being opened permits of the deposit charged with oil that falls to the bottom of the boiler being discharged, together with a certain quantity of water, by the force of steam in the boiler acting on the water; and the bottom of the boiler I prefer to make inclined, to facilitate such discharge of deposit; but as the deposit does not adhere to the boiler its removal by thus blowing off does not involve the necessity of interfering to any great extent, or at all, with the working of the boiler, and to blow off about six inches depth of water once in twenty-four hours, where the boiler is being worked continuously, will be found amply sufficient.

The boiler may also have connected with it, a little below the ordinary water-level, a discharge-pipe, *g*, furnished with a blow-off cock, *h*, in order that when the oil floating on the water has attracted a large quantity of the lime, which may be seen by a glass water-gage, *i*, it and all floating deposit may be discharged by opening said cock *h*, and, by establishing a connection with the lower blow-off branch, *e*, by means of a pipe, *k*, be passed into and discharged from said lower branch pipe, or be passed off by a separate blow-off pipe, as preferred. Thus is the oil, with its deposit held in solution, prevented from forming a dense coating on the surface of the water, stopping evaporation, and no stoppage in the working of the boiler is necessary to effect its discharge of the oil and floating lime, while the feed-water to the boiler will supply the place of the discharge. In this way I effectually prevent incrustation, regulate in the most perfect manner to meet requirements the quantity of oil necessary at any one time, and feed in the necessary material to prevent incrustation, as well as remove deposit and the impregnated oil without of necessity stopping the use or working of the boiler. Incrustation being thus perfectly prevented, the objection to the use of fusible plugs as a safeguard against accident from the water falling too low in the boiler is removed. The deposit of lime in the feed-supply or at the water-feed inlet choking the feed and endangering its stoppage is also prevented. A certain amount of lubricating matter, too, will be conveyed by and with the steam passing from the boiler, which, where the boiler is used for working an engine, will serve to ease the working of the valves and piston of the engine.

To thus carry my improved process for preventing incrustation into effect, it is an essential qualification that the oleaginous material should be fed to the boiler in a liquid state; but the quality or description of oil used may be varied, and the quantity furnished is, as previously explained, under the most perfect command to meet current requirements, thus avoiding waste and other objections.

I am aware that grease and other oleaginous matter has been used as a means of preventing boilers from priming, and that it has been used for that purpose in a manner totally different from that specified above and which constitutes my invention. I therefore lay no claim to the use of fat or oily substances for the purpose of preventing boilers from priming, whether said substances be in a solid or liquid state; but

I claim—

The means and the manner herein specified of injecting oil or other fatty matter in a liquid state into the boiler, for the purposes set forth, whereby the said oil or fatty matter is fed to the boiler simultaneously and in connection with the water, as described.

JOHN WARREN HARNETT.

In presence of—
  JOHN A. LYNCH,
  ELIZABETH HARNETT.